United States Patent [19]

Gender

[11] Patent Number: 5,446,967
[45] Date of Patent: Sep. 5, 1995

[54] MOUNTING APPARATUS

[75] Inventor: James R. Gender, Kirkwood, Mo.

[73] Assignee: Hunter Engineering Company, Bridgeton, Mo.

[21] Appl. No.: 70,536

[22] Filed: Jun. 1, 1993

[51] Int. Cl.$^6$ .................... G01B 5/255; G01B 11/275
[52] U.S. Cl. .................. 33/203.18; 33/299; 33/336
[58] Field of Search ............... 33/203, 203.18, 203.19, 33/203.2, 299, 336, 600

[56] References Cited

U.S. PATENT DOCUMENTS

| | | | |
|---|---|---|---|
| 2,402,041 | 6/1946 | Greenleaf et al. | 248/201 |
| 2,475,502 | 7/1949 | Holmes | 248/201 |
| 3,426,991 | 2/1969 | Rishovd | |
| 3,488,023 | 1/1970 | Shooter et al. | |
| 3,581,403 | 6/1971 | Tuttle | 33/203.16 |
| 4,159,574 | 7/1979 | Samuelsson et al. | 33/203.18 X |
| 4,167,817 | 9/1979 | Hunter | 33/288 |
| 4,176,463 | 12/1979 | Ringle | 33/203.18 |
| 4,285,136 | 8/1981 | Ragan | 33/336 X |
| 4,534,115 | 8/1985 | Kashubara | 33/203.18 |
| 4,918,821 | 4/1990 | Bjork | 33/203.18 |
| 5,024,001 | 6/1991 | Borner et al. | 33/203.18 |
| 5,048,192 | 9/1991 | Pascoal | 33/203.18 |
| 5,056,231 | 10/1991 | Alusick et al. | 33/203.18 |

FOREIGN PATENT DOCUMENTS 0165704 7/1988 Japan .................... 33/203

OTHER PUBLICATIONS

Brochure, entitled CTS Conti Tyre System (no date).

*Primary Examiner*—Alvin Wirthlin
*Attorney, Agent, or Firm*—Haverstock, Garrett & Roberts

[57] ABSTRACT

Apparatus adaptable for attaching to a plurality of lugs associated with a vehicular wheel assembly to enable mounting a wheel alignment instrument or other device adjacent to the vehicular wheel assembly, the apparatus including a plurality of lug engaging members or assemblies movable to angularly and radially spaced positions relative to the axis of rotation of a vehicular wheel assembly corresponding to the locations of selected lugs of different lug patterns for attachment thereto, the preferred construction being adaptable for attachment to at least lug patterns having four, five, six and eight lugs and to different size and shape lugs, and including structure enabling radially moving the lug engaging members simultaneously by rotation of a hand knob or other member and structure enabling positioning and maintaining the lug engaging members in a desired angular relationship during radial movement thereof and attachment to the wheel lugs.

17 Claims, 9 Drawing Sheets

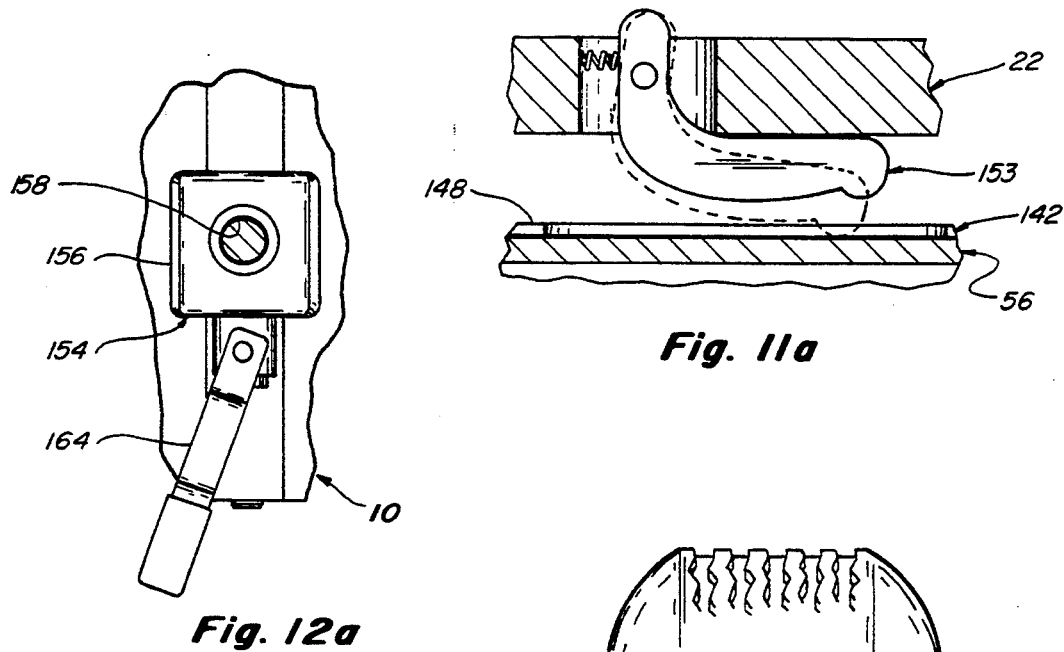
Fig. 11a
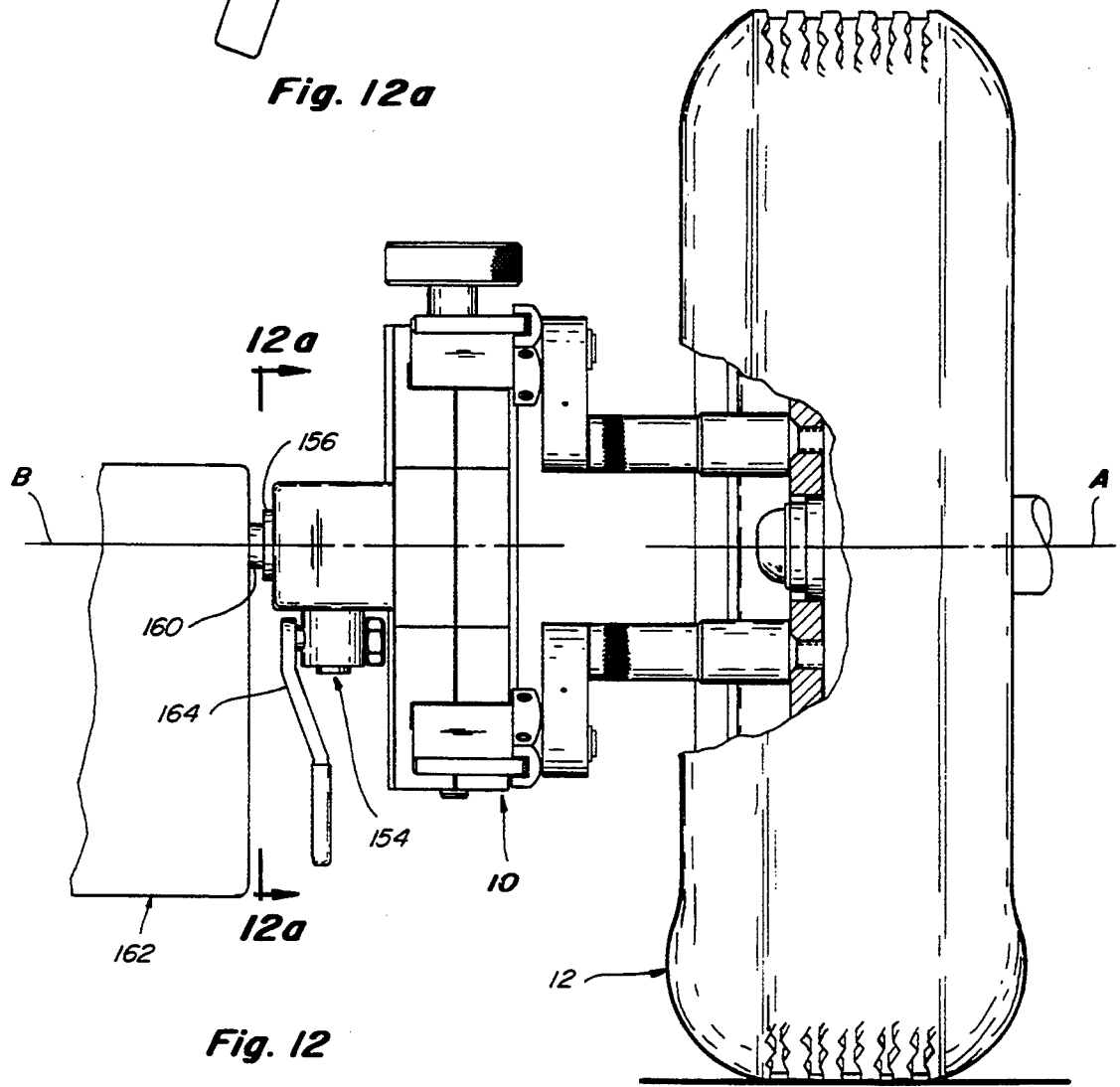
Fig. 12a
Fig. 12

MOUNTING APPARATUS

The present invention relates generally to automotive and vehicular service equipment, and more particularly, to a device for mounting wheel alignment instruments and other service and diagnostic equipment adjacent to automotive and other vehicular wheels.

BACKGROUND OF THE INVENTION

The vehicular service equipment art includes a variety of means used for ascertaining and adjusting the alignment of vehicular wheels and for diagnosing and correcting other wheel related conditions. Such means can include instruments which often must be mounted in predetermined relation to some location on the wheel, particularly the rotational axis thereof. For instance, some wheel alignment systems include instruments such as sensors and positional indicators which must be precisely positioned in relation to the wheel axis for determining such parameters as the camber, caster and toe-in angles of the wheel. Some instruments can also require precise placement to enable communication via a wire or by optical or other means with instruments mounted on the other wheels or with a base unit.

The most common prior art devices for mounting alignment instrumentation operate by gripping an outer flange portion of the wheel rim at three or four radially spaced locations by forcing finger members radially outwardly or inwardly in a collective clamping action against the flange surface, such as disclosed in U.S. Pat. No. 4,167,817. The radial clamping action enables adjusting for different wheel diameters and operates to center the device on a wheel to enable an alignment instrument to be mounted in precise relation to the wheel axis.

Such prior art devices, however, are limited as the flange portion of the wheel rim must be exposed or at least accessible by the attachment device. This limitation has become important in light of several factors influencing modern automotive design. For instance, some fender designs cover or obscure a portion of the wheel rim, usually for styling or aerodynamic purposes, and can leave insufficient space between the fender and the wheel rim for the alignment instrument to be mounted. This problem becomes particularly acute when the wheel must be rotated with the attachment device mounted thereon. Another factor is the increasing use of wheels constructed of aluminum, magnesium, plastic coated steel and other materials, which wheels may not provide a suitable flange surface around the rim for gripping with the prior art devices. Such construction materials may also be relatively soft and can be objectionably marred by contact with the prior art devices. Still further, some proposed new tire constructions cover or envelope the wheel rim within the tire. Such constructions provide only rubber tire surfaces for gripping to which the prior art devices may not provide a sufficiently secure attachment. These design trends have led to a search for alternative locations for attachment to vehicular wheels for mounting alignment instrumentation and the like adjacent thereto.

The wheel lugs, which include a plurality of threaded members located in a circular pattern around the axis of the wheel, provide a desirable alternative location for attachment to a vehicular wheel. However, unlike the wheel rim which provides a uniform surface around the wheel to grip, the wheel lugs and their pattern of location can vary considerably from vehicle to vehicle and can include 4, 5, 6 or more lugs located in different diameter circular patterns. For instance, four and five lug patterns are commonly found on passenger cars. The threaded lug bolts or nuts can also have a variety of different sizes and shapes. Such variables, particularly the differences in geometry between the respective lug patterns, present a difficult challenge in the design of a single mounting apparatus which can be used with a wide range of wheels.

More particularly, on a wheel having a four lug pattern the lugs are evenly spaced at 90° angular intervals around the wheel axis. Five lug patterns have lugs which are 72° apart. Six and eight lug patterns have lugs which are 60° and 45° apart, respectively. Furthermore, even-numbered lug patterns, such as those including 4, 6, and 8, lugs, are symmetrical about two normal planes which intersect along the wheel axis. A five lug pattern, on the other hand, is symmetrical about only one plane. This is an important difference, as will be discussed below. A mounting apparatus for use with a variety of wheels must therefore be capable of attachment to all of these different lug patterns, and also various lug pattern diameters, while still enabling accurately locating an alignment instrument in desired relation to a wheel.

SUMMARY OF THE INVENTION

The present invention overcomes the above-discussed limitations and problems associated with the prior art and teaches the construction and operation of a device which enables mounting service and diagnostic equipment such as an alignment instrument adjacent to a vehicular wheel by attachment to the wheel lugs. The present device is adaptable for attaching to a variety of wheel lug patterns, including patterns of 4, 5, 6 and 8 lugs, and different lug pattern diameters, and the device can be accurately centered on the wheel to enable mounting an alignment instrument in the same precise position relative to the axis of rotation for any of the different lug pattern configurations. The device is lightweight, easy to use, and is adaptable for use with a variety of different lug sizes and types.

Importantly, to enable attachment to different lug patterns, the present device includes a plurality of means for cooperatively engaging or gripping a plurality of wheel lugs, the respective lug engaging means being movable to positions corresponding to the locations of selected lugs of different lug patterns. In the preferred construction the lug engaging means are located around a central axis of the device and are pivotably movable to different angularly spaced positions around the central axis corresponding to the locations of selected lugs of different lug patterns around a wheel axis. The preferred lug engaging means are also movable radially inwardly toward the central axis and radially outwardly away from the central axis to facilitate positioning the lug engaging means for attachment to the respective lugs, and to further enable adjusting the radial positions of the lug engaging means to correspond with different lug pattern diameters. Still further, the preferred lug engaging means are positionable in radially equidistant relation around the central axis of the device such that the central axis can be located in coaxial relation with the axis of rotation of a wheel when the device is attached thereto. This enables accurately centering the device over the axis of a wheel, and it enables an alignment instrument or other means mounted in a known relation to the central axis of the device to be positioned in the same relation to the axis of a wheel on which the device is mounted.

The present device can include any number of a plurality of lug engaging means. The lug engaging means can include, for instance, lug clamp assemblies each including a pivotable member having means adjacent a free end thereof for cooperatively engaging or clamping to a wheel lug, the pivotable member being capable of having a variety of sizes and shapes and being pivotably mounted at different locations relative to the center of the device so as to be movable to enable attachment to different lug pattern configurations. For instance, the preferred construction includes four lug clamp assemblies having members pivotably mounted at alternating angular intervals of approximately 72° and 108° around the central axis of the device. This construction provides the capability for attachment to selected lugs of 4, 5, 6 and 8 lug patterns, which are the most common vehicular wheel lug patterns, as well as lug patterns having multiples of these numbers of lugs. Other combinations of lug engaging means incorporating the teachings of the present invention could be used for these and other lug patterns, however, it has been found that four lug clamp assemblies pivotably mounted in this angular relation provides the desired versatility and facilitates secure attachment and ease of use, as explained hereinafter.

The device can include suitable means for mounting service or diagnostic means or equipment thereon, for instance, a conventional mounting spindle or bore for mounting an alignment instrument on the device. The mounting spindle or bore can be located in coaxial relation to the central axis of the device such that an alignment instrument mounted thereon can be located in coaxial or other desired relation to a wheel axis.

The device can include suitable means enabling radially moving and positioning the lug engaging means for attachment to different lug patterns, such radial moving or adjusting means desirably operating to radially move the lug clamp assemblies simultaneously. The lug engaging means can be movable along a linear path, or alternatively, along an arcuate or other path which imparts radial movement to the respective lug engaging means relative to the central axis. One preferred construction of radial moving or adjusting means is a turnbuckle mechanism which imparts linear radial movement simultaneously to all of the lug engaging means simply by rotating a single hand knob or other simple means. An alternative construction can include, for instance, a gear mechanism which imparts linear or alternatively arcuate or other radial movement simultaneously to all of the lug engaging means, also by the rotation of means such as a hand knob.

The respective lug engaging means can comprise any suitable means for gripping or attaching to a lug nut or bolt. For instance, conventional hexagonal or other shaped socket means for cooperatively receiving and gripping a similarly shaped lug nut or bolt head and which can apply clamping pressure thereagainst by the radial extension or retraction of the device can be used, as well as other socket or sleeve type means. Cam-type locking means such as disclosed below for attachment to one or more different size lugs can also be used. Such lug engaging means can be interchangeable and also rotatable so as to facilitate attachment and enable more evenly distributing wear therearound.

To facilitate ease of use, the device can further include optional means enabling positioning and maintaining the lug engaging means in the proper angular relation for attachment to the various number lug patterns, even during radial movement of the lug engaging means, such that a user need only radially adjust the device for the diameter of a particular lug pattern during attachment to the lugs. The preferred positioning means include a template or guide plate having a plurality of grooves or slots formed therein and slidably engageable by means on the respective lug clamp assemblies or other lug engaging means as radial adjustments are made. The slots can have a linear, or alternatively, an arcuate or other shape corresponding to the paths of radial movement of the lug engaging means. It is also desirable that the device be relatively lightweight so as to be capable of being held in one hand while the lug engaging means are adjusted and the device is mounted on a wheel.

Using the present mounting device is easy. With the proper means for engaging or gripping the lugs of a particular wheel mounted on the device, the respective lug engaging means can be pivoted or otherwise moved to angular positions corresponding to the locations of selected lugs of a wheel and the optional positioning means engaged to hold the lug engaging means in position. The hand knob can then be operated to simultaneously radially extend or retract the lug engaging means to correspond to the lug pattern diameter. The device can be positioned with the central axis in coaxial relation to the wheel axis, and with the lug engaging means aligned with the selected wheel lugs, the device can be attached to the wheel lugs. To secure the device to the lugs, the hand knob can be further rotated to exert a radially outwardly or inwardly clamping force against the lugs, or alternatively the optional cam locking means or other securing means can be engaged. Alignment means mounted on the device will then be located in precise, predetermined relation to the wheel axis. When the alignment or other operation is complete, the device can be detached from the lugs and quickly and easily set up in the above-described manner for attachment to a different wheel lug configuration.

OBJECTS OF THE INVENTION

It is therefore a principal object of the present invention to enable mounting wheel alignment means and other equipment on or adjacent to automotive and vehicular wheels.

Another object is to enable mounting alignment instruments and the like adjacent to wheels where the wheel rim is covered or otherwise inaccessible or obscured by a fender or tire or the like.

Another object is to enable precisely mounting alignment instruments and other equipment adjacent to automotive and vehicular wheels by attachment to the wheel lugs.

Another object is to provide a mounting apparatus which can be quickly and easily adapted for attachment to a variety of different lug patterns and sizes.

Another object is to provide a mounting device adaptable for attachment to selected lugs of 4, 5, 6, 8 and other lug patterns.

Another object is to provide a mounting device which is adaptable for attachment to different sizes and shapes of wheel lugs.

Another object is to expedite alignment and other procedures performed on wheel assemblies.

Another object is to provide a mounting device which is relatively lightweight and simple and easy to use.

These and other objects and advantages of the present invention will become apparent to those skilled in the art after considering the following detailed specification in conjunction with the accompanying drawings wherein:

BRIEF DESCRIPTION OF THE DRAWINGS

FIG. 11a is a fragmentary cross-sectional view of a lug clamp assembly and the positioning means of FIG. 11, showing typical spring detent means in association therewith;

FIG. 12 is a side elevational view of the device of FIG. 1 shown mounted on a vehicular wheel, and showing means for mounting a wheel alignment intrument thereon; and FIG. 12a is a fragmentary view taken along lines 12a—12a of FIG. 12, showing the mounting means.

DETAILED DESCRIPTION OF THE PREFERRED EMBODIMENTS

Figure 1:
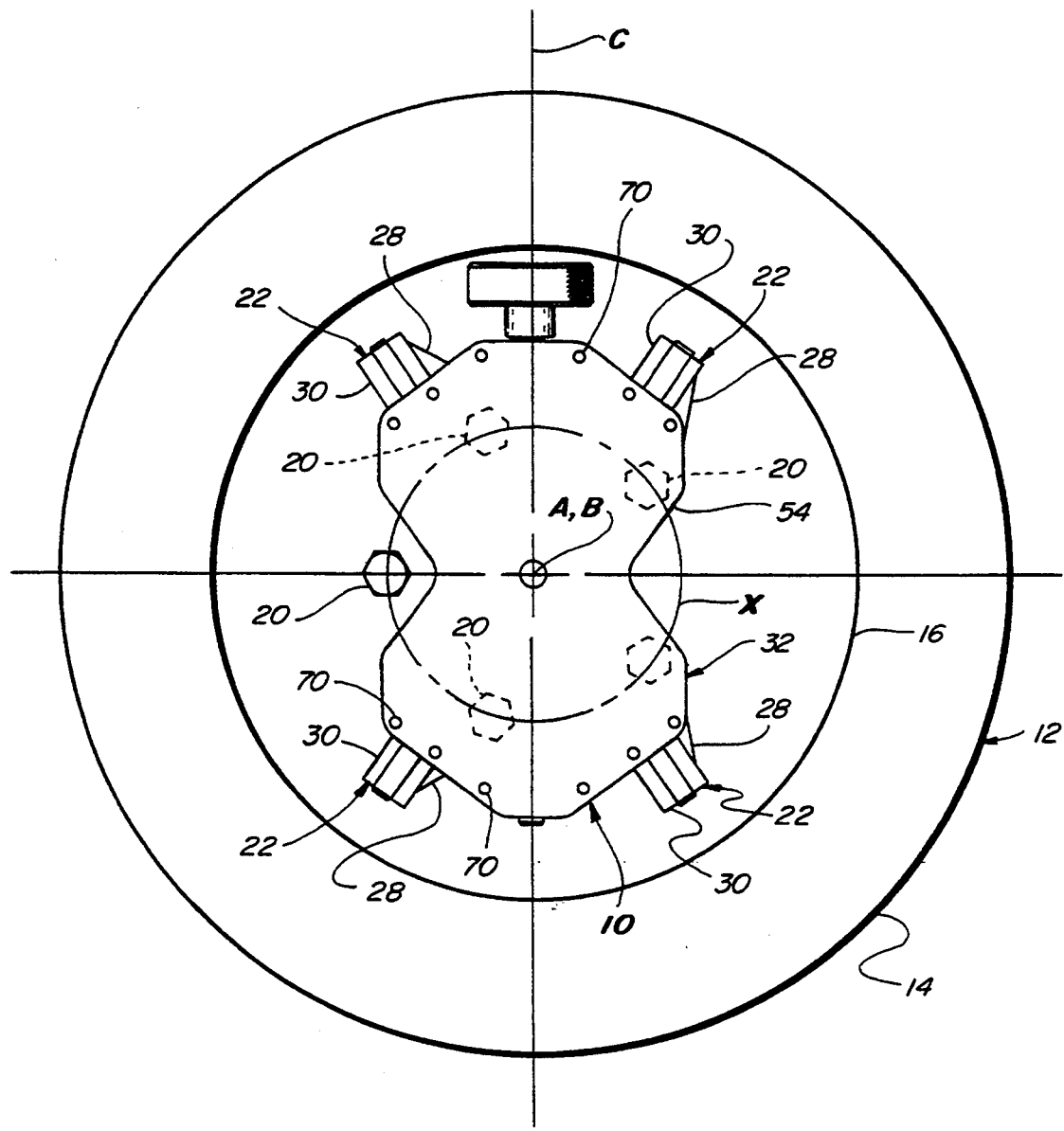
FIG. 1 is a front elevational view of a device for mounting instruments on vehicular wheels constructed according to the teachings of the present invention shown mounted in position on a vehicular wheel assembly.
Figure 2:
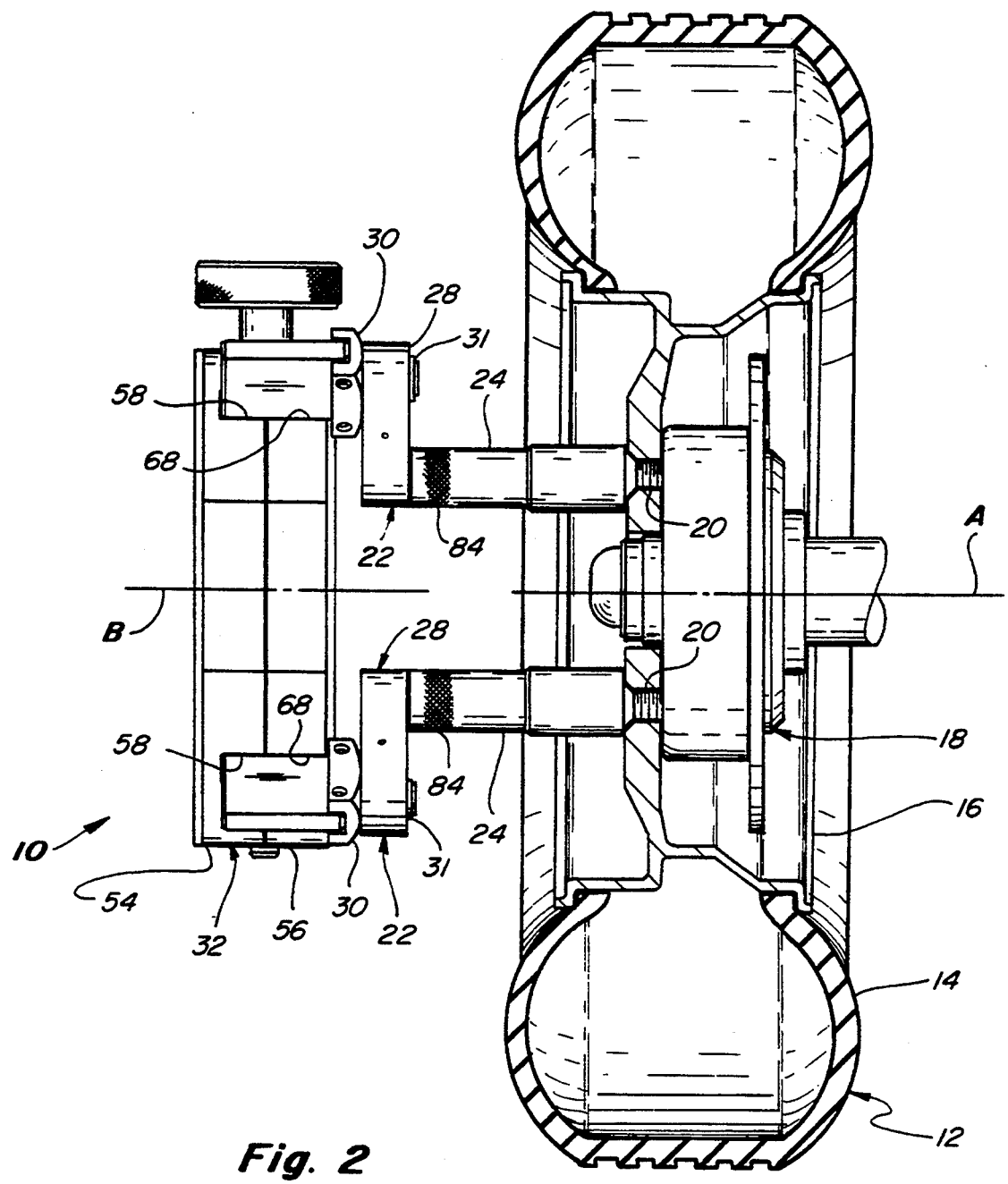
FIG. 2 is a side elevational view of the device of FIG. 1 shown mounted on a vehicular wheel assembly shown in partial cross-section.

Referring now to the drawings more particularly by reference numbers, wherein like numerals refer to like parts, number 10 in FIG. 1 identifies an apparatus constructed according to the teachings of the present invention for mounting wheel alignment instruments and other service equipment adjacent to automotive and vehicular wheels. The device 10 is adaptable for attachment to wheels having lug patterns including 4, 5, 6 and 8 lugs and various lug pattern diameters. The device 10 is shown attached to a vehicular wheel or wheel assembly 12 in position for mounting an alignment instrument or other instrumentation (See FIG. 12) in precise relation to the wheel for such purposes as ascertaining the various wheel alignment parameters such as caster, camber, toe-in, setback, centerline steering and rear wheel track. Referring also to FIG. 2, the wheel assembly 12 is of conventional construction and includes a pneumatic tire 14 mounted on a wheel rim 16. The wheel rim 16 is mounted on an axle hub assembly 18 and is secured thereto with a plurality of lugs 20. The lugs 20 are arranged in angularly spaced relation in a circular pattern having a diameter designated by the letter X, which lug pattern is concentric to the axis of rotation of the wheel, identified by the letter A. The individual lugs 20 each comprise a threaded nut and a stud or a bolt having a hexagonal shaped outer surface which can be engaged or gripped by the device 10.

Figure 3:
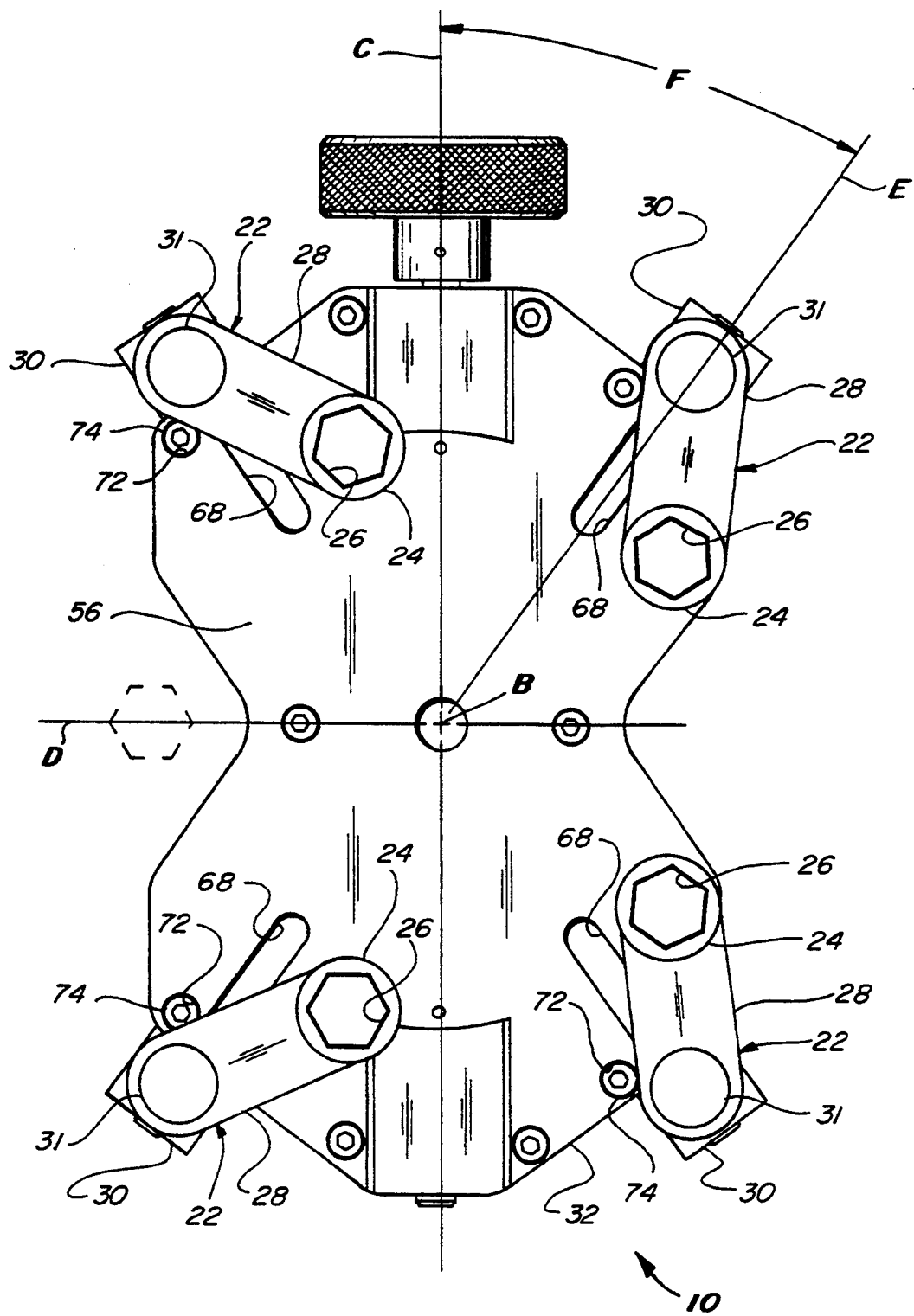
FIG. 3 is a rear elevational view of the mounting device of FIG. 1.

The mounting device 10 includes a plurality of lug engaging means for cooperatively engaging a plurality of wheel lugs. Each of the lug engaging means include a lug clamp assembly 22 including means cooperatively engageable with a lug, such as the cylindrical or tubular shaped sleeve or socket member 24 having a hexagonal shaped internal cavity 26 for cooperatively receiving and engaging a lug, as shown in FIG. 3. Each of the sleeve members 24 is rotatably mounted adjacent to the distal or free end of an elongated pivot arm 28 of the lug clamp assembly, the proximal end of which pivot arm 28 is pivotably mounted on a pivot block 30, as shown at 31. Each pivot block 30 is mounted for radial movement on a base member 32, discussed in greater detail below. The pivot blocks 30 are located in angularly spaced relation around a central axis of the base member 32 identified by the letter B. The device 10 is positionable with the central axis B in coaxial relation with the rotational axis of a wheel or wheel assembly on which the device is to be mounted, such as the axis of rotation A of the wheel assembly 12, as shown in FIGS. 1 and 2. The lug clamp assemblies 22 are pivotable about their respective pivot blocks 30, and are radially movable via the pivot blocks 30, in a plane which is normal to the central axis B of the device. This plane of movement will also be normal to the rotational axis of a wheel when the device is positioned for attachment thereto.

The construction shown includes four lug clamp assemblies 22 mounted on respective pivot blocks 30 which are angularly related at alternating angles of approximately 72° and 108° around the central axis B. This placement positions the pivot blocks 30 in symmetrical relation about two normal planes which pass through the device and intersect along the central axis B, including a first plane of symmetry designated by the letter C, and a second plane of symmetry designated by the letter D, as shown in FIG. 3. Explaining this angular relation another way, each pivot block 30 is located along a radially extending line, such as designated by the letter E, and each of which radial lines is oriented at approximately one half the 72° angle or 36° from the plane of symmetry C, such as designated by the angle F. The device 10 is shown with the plane of symmetry C oriented vertically for ease of illustration. It is important to note that the device 10 can also be positioned in any other desired angular orientation about a wheel axis for attachment to a wheel.

Figure 4A:
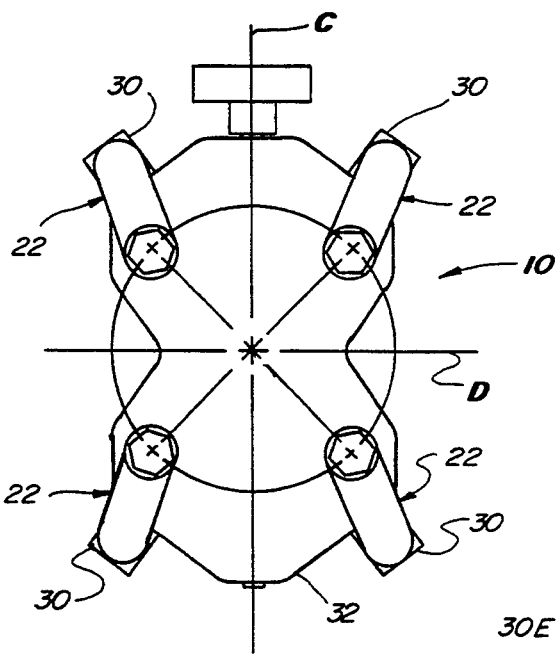
FIGS. 4a, 4b, and 4c are schematic views of the mounting device of FIG. 1 showing the respective lug engaging means thereof positioned for attachment to a wheel having a four lug pattern, a six lug pattern and a five lug pattern, respectively.
Figure 4C:
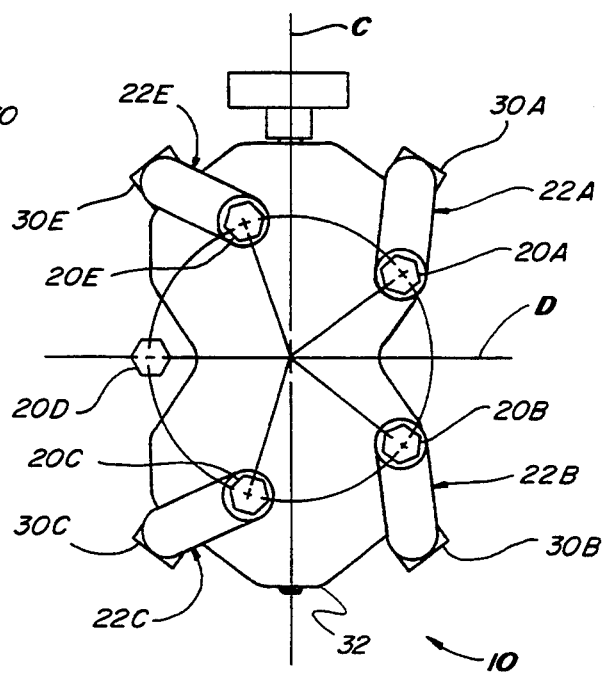
Figure 4B:
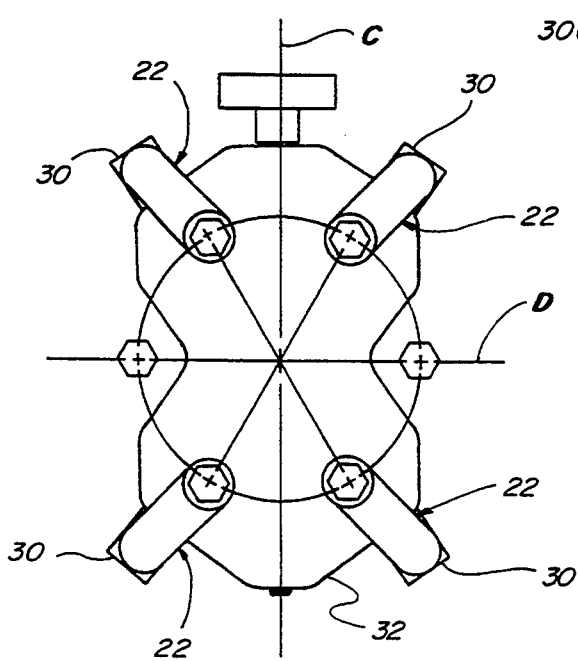

To illustrate the placement capability of the respective lug clamp assemblies 22, reference is made to FIGS. 4a–c which show the device 10 in the same orientation as in FIG. 3 but in schematic form. FIG. 4a is a schematic view of the device 10 showing the locations of the respective lug clamp assemblies 22 for attachment to a typical four lug pattern, which positions are the same as for attachment to an eight lug pattern. FIG. 4b shows the respective lug clamp assemblies 22 positioned for attachment to selected lugs of a six lug pattern. FIG. 4c shows the respective lug clamp assemblies 22 positioned for attachment to selected lugs of a five lug pattern.

With the device 10 positioned in coaxial relation to a vehicle wheel which has 4, 6 or 8 equally spaced lugs, it is obvious with reference to FIGS. 4a and 4b that since the lug patterns are symmetrical about two normal planes which intersect at a central or rotational axis, just as the pivot blocks are symmetrical about two normal planes as discussed above, each pivot block 30 will be the same distance from a selected lug. Attachment to the lugs can then be made by pivoting the respective lug clamp assemblies 22 the same amount to span the distance from the pivot block 30 to the lug. It can be seen that this concentric and coaxial positioning capability can also be achieved in these cases with other than the preferred 36° angle between one plane of symmetry and each of the pivot blocks 30. However, when used on a vehicle wheel having a five lug pattern, the preferred 36° angle is important, as explained next.

Referring in greater detail to FIG. 4c the device 10 is shown for attachment to a five lug pattern having lugs which are spaced 72° apart. The plane of symmetry C of the device 10 is again shown oriented vertically and represents a 0° position. The plane of symmetry D is oriented horizontally and the wheel is oriented such that the plane of symmetry D passes through one of the five lugs. Again, this positioning is for purposes of illustration, and in actual use the wheel and the device 10 can be positioned with the plane C at other than a vertical orientation. It can be seen that by proceeding in a clockwise direction from the vertically oriented plane of symmetry C, the first lug, designated lug 20A, will be positioned at 54° from the plane C. This will result in an 18° difference between the position of the lug 20A and the nearest pivot block, designated as pivot block 30A, which is at 36° from the plane C. To position the lug clamp assembly 22A for attachment to the first lug 20A, the lug clamp assembly is pivoted across this 18° difference as shown. The second wheel lug 20B is located at 126° from the plane C (72° from lug 20A) and the nearest pivot block 20B will be at 144° (36° from the portion of the plane C below the plane D), which is 18° from the position of the lug. Similarly, there will be an 18° difference between the third lug 20C which is at 198° (144° from the first lug) and the nearest pivot block 30C which is at 216°. The fourth lug 20D is located on the plane D at 270° and is not engaged by a lug clamp assembly. The fifth lug 20E is located at 342° clockwise from the starting point and is also 18° from the nearest pivot block 30E which is located at 324° from the starting point. It is important to note that the angular configuration of the present device enables the 18° difference between the respective lugs and the nearest pivot blocks to be spanned by the pivot arms in the same manner even though the five lug pattern is not symmetrical about two normal planes. This locates the gripping means mounted on the respective pivot blocks radially equidistant from the central axis B and enables the central axis of the device to be located coaxially with the axis of a wheel to which the device is attached.

The present device 10 includes means enabling moving or adjusting the pivot blocks 30 radially inwardly and outwardly relative to the central axis B to facilitate positioning the lug clamp assemblies 22 for attachment to selected lugs of different lug patterns, and also to enable adjustment for different lug pattern diameters. The radial adjusting means can include any suitable means enabling positioning the pivot blocks 30 at different, but radially equidistant positions relative to the central axis B.

Figure 5:
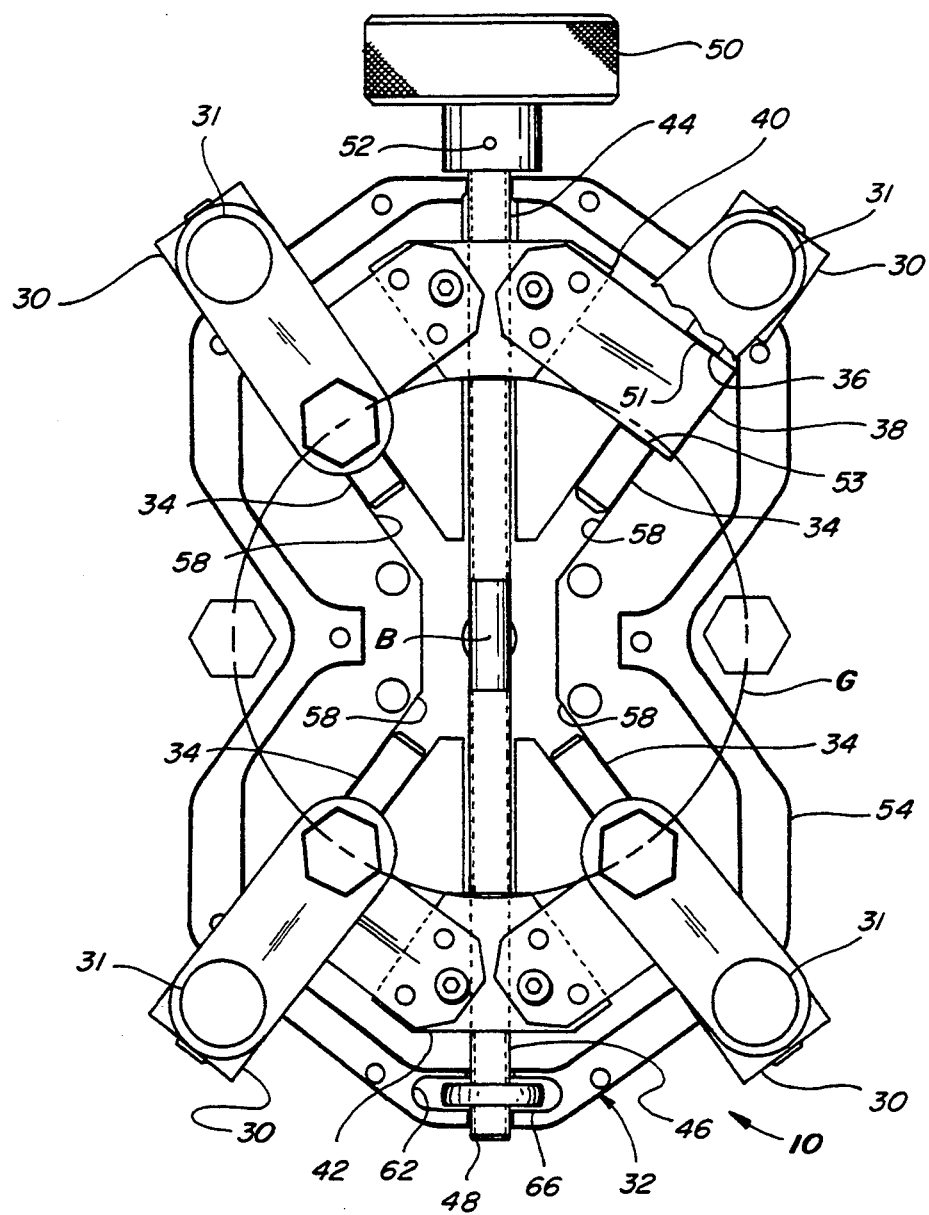
FIG. 5 is a rear elevational view of the device of FIG. 1 showing the rear housing member removed to expose the radial adjusting means positioned for locating the lug engaging means in one radial position.
Figure 6A:
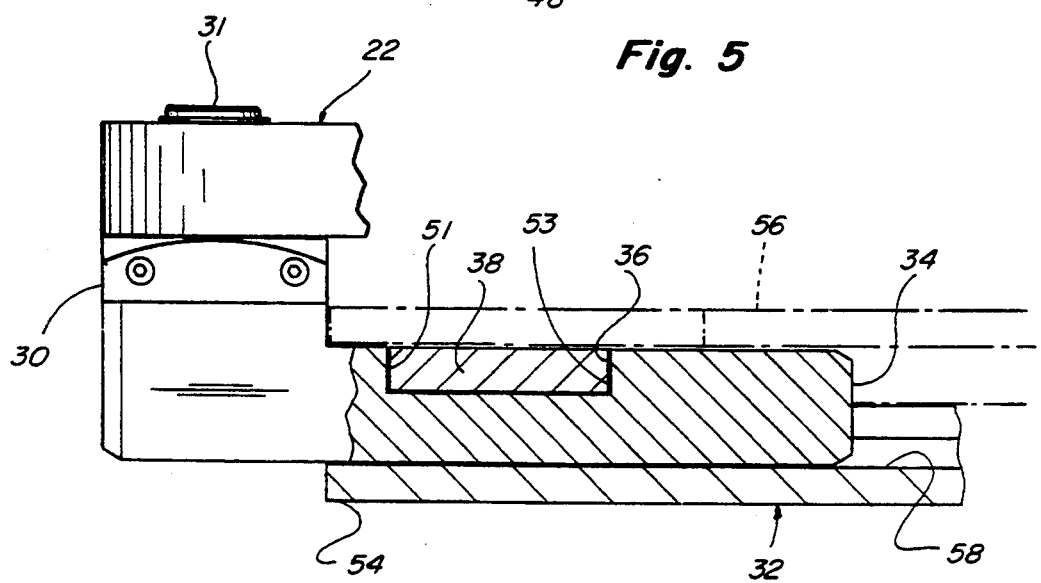
FIG. 6a is an enlarged fragmentary partial cross-sectional view taken along line 6a—6a of FIG. 6, showing the relationship of the adjusting rod and the slide bar components of the radial adjusting means associated with one of the lug engaging means, and showing in phantom lines the rear housing member.
Figure 6:
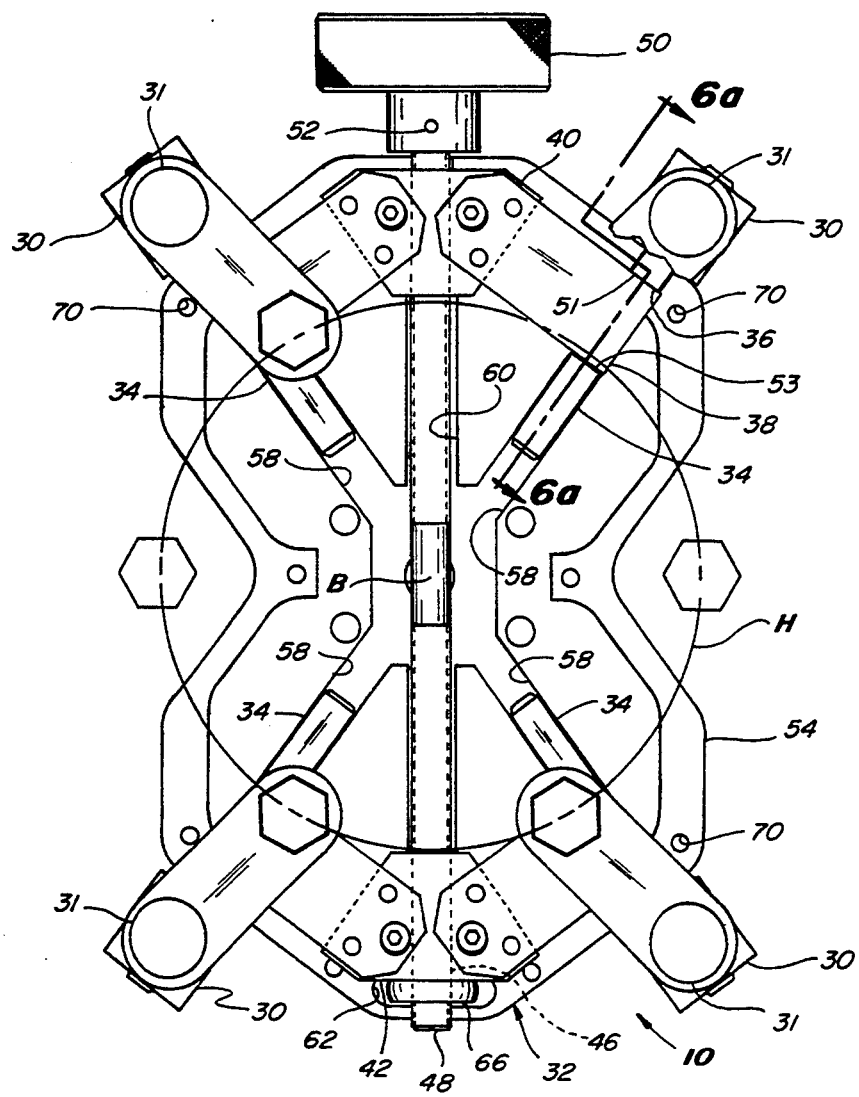
FIG. 6 is a rear elevational view of the device of FIG. 1 showing the rear housing member removed to expose the radial adjusting means positioned for locating the lug engaging means in an alternative radial position.

One radial adjusting means construction is a turnbuckle assembly, as shown in FIGS. 5, 6 and 6a. In this construction each pivot block 30 is mounted adjacent the outermost end of a radially extending adjusting rod or bar 34 mounted for radial movement in a slot or groove 58 located on the base member 32. Each of the adjusting rods 34 is preferably of rectangular cross-section and includes a slot 36 formed therein at an intermediate location along the length thereof, as best shown in FIG. 6a, which slot 36 slidably receives a slide bar member 38. The slide bars 38 are mounted on one of two threaded blocks 40 and 42, located respectively adjacent opposite ends of the base member 32. The threaded blocks 40 and 42 are threadedly engaged with a right handed threaded portion 44 and a left handed threaded portion 46, respectively, located adjacent the opposite ends of a turnbuckle shaft member 48. A hand knob 50 is located adjacent one end of the turnbuckle shaft 48 and is fixedly mounted thereon using suitable means such as a set screw or roll pin such as shown at 52. The hand knob 50 is rotatable in a first direction to rotate the turnbuckle shaft 48 such that the threaded blocks 40 and 42 are moved simultaneously radially inwardly relative to the central axis B, and the knob 50 is rotatable in the opposite direction to simultaneously move the threaded blocks radially outwardly.

Rotating the turnbuckle shaft 48 causes relative sliding movement of the slide bars 38 in the slots 36 of each adjusting rod 34 to cause radial movements thereof. For instance, as the turnbuckle shaft 48 is rotated in the direction to move the adjusting rod 34 radially outwardly, the adjusting rod 34 slidably engages the edge of the slot 36 at 51. Rotating the turnbuckle shaft in the opposite direction causes sliding engagement at 53 to radially retract the rod 34. Referring to FIG. 5, the position of the slide bars 38 relative to the adjusting rod 34 can be observed for positioning the pivot blocks 30 for attachment of the respective lug clamp assemblies 22 to selected lugs of a lug pattern having a diameter designated by the letter G. Referring to FIG. 6, the relative positions of the slide bars 38 and adjusting rods 34 can be observed for attachment to a lug pattern diameter identified by the letter H, which diameter H is larger than the diameter G.

The turnbuckle assembly is mounted in an internal cavity of the body member 32, which body member 32 is shown having an hour glass outer shape enabling grasping and holding the narrower central portion thereof while adjusting and mounting the device 10 on a wheel. The body member 32 is of two-piece construction and includes opposing front and rear housing members 54 and 56, respectively, as best shown in FIG. 2. The front housing member 54 forms that side of the device 10 which faces a user, and the rear housing member 56 forms the side of the device which faces the wheel on which the device 10 is mounted. The front housing member 54 includes a plurality of angularly spaced radially extending grooves 58 formed therein adjacent the internal cavity of the body member, which grooves 58 intersect at a location corresponding to the central axis B, as shown in FIGS. 5 and 6. Each groove 58 associated with a respective lug clamp assembly 22 slidably receives the respective adjusting rod 34 which is radially movable in the groove. The front housing member 54 also includes another groove 60 extending the length thereof, which groove 60 receives the turnbuckle shaft 48. A smaller cavity 62 is formed in the front and rear housing members 54 and 56 adjacent one end thereof for receiving a keeper bearing or bushing 66 mounted on the turnbuckle shaft 48. The keeper bearing or bushing 66 maintains the turnbuckle shaft 48 in a fixed location relative to the central axis B of the device, while still enabling rotation of the shaft.

The rear housing member 56 includes a plurality of angularly related radial slots 68 therethrough corresponding in angular location to the grooves 58 of the front housing member 54, as shown in FIGS. 2 and 3. The slots 68 receive the respective adjusting rods 34 and facilitate the passage of the pivot blocks 30 adjacent to the outer surface of the housing member 56 to enable the adjustment of the device for a wide range of different lug pattern diameters. Each of the respective front and rear housing members 54 and 56 includes a plurality of corresponding holes 70 and 72, which holes 70 on the first member are threaded and receive fastening means such as threaded fasteners 74 for joining the housing members together.

Figure 7:
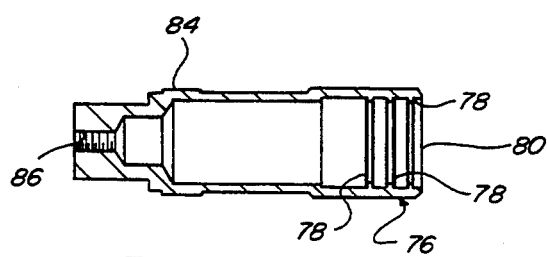
FIG. 7 is a cross-sectional view of a sleeve type lug engaging member for use with the device of FIG. 1.
Figure 8:
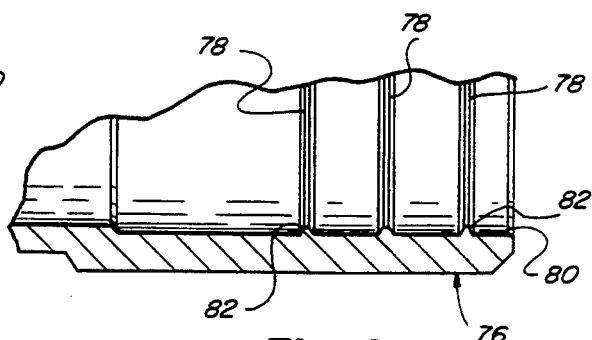
FIG. 8 is an enlarged fragmentary cross-sectional view of the lug engaging member shown in FIG. 7.

The present device 10 can include any of a variety of different means for attachment to the respective wheel lugs in addition to the sleeve or socket members 24 discussed above. One alternative attachment means is shown in FIGS. 7 and 8. This alternative uses a lug clamp sleeve 76 having a cylindrical shaped inner cavity for receiving the lug instead of hexagonal shaped surfaces engageable with the lug as shown above. The lug clamp sleeve 76 further includes a plurality of annular shaped gripping teeth 78 located around the inner cavity adjacent to the open end 80. The gripping teeth 78 have an inner diameter corresponding to the outer diametrical dimension of a hexagonal lug nut or bolt head and include sharp edges 82 which engage and grip the corners of a lug inserted into the opening 80. Rotating the knob 50 moves the lug clamp assemblies radially inwardly or outwardly causing the sharp edges to further grip or bite the lug or to release the lug. The lug clamp sleeves 76 and also sleeves 24 can further include a knurled portion 84 around the outer surface thereof to facilitate use, and the lug clamp sleeves can be attached to the pivot arms 28 using any suitable means such as threaded bores 86 engageable by threaded members on the pivot arm (not shown). The sleeves 76 and 24 can be rotatably attached to the pivot arm 28 to facilitate attachment and to enable more even distribution of wear around the lug clamp sleeves. The lug clamp sleeves can also be of various sizes corresponding to different lug sizes.

Figure 9:
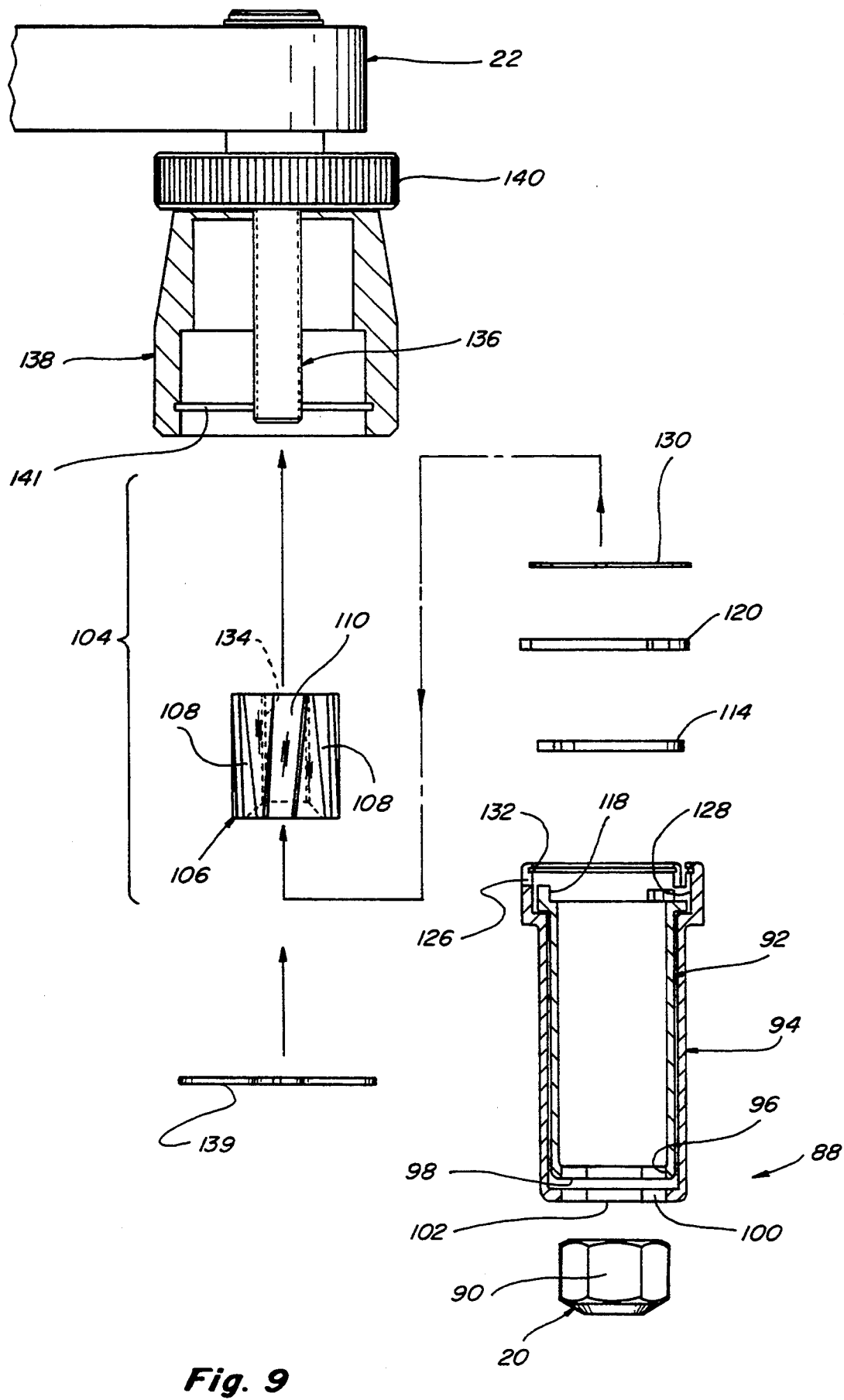
FIG. 9 is an exploded cross-sectional view of alternative cam type lug engaging means shown in exploded form, and showing a typical lug nut in association therewith.
Figure 10:
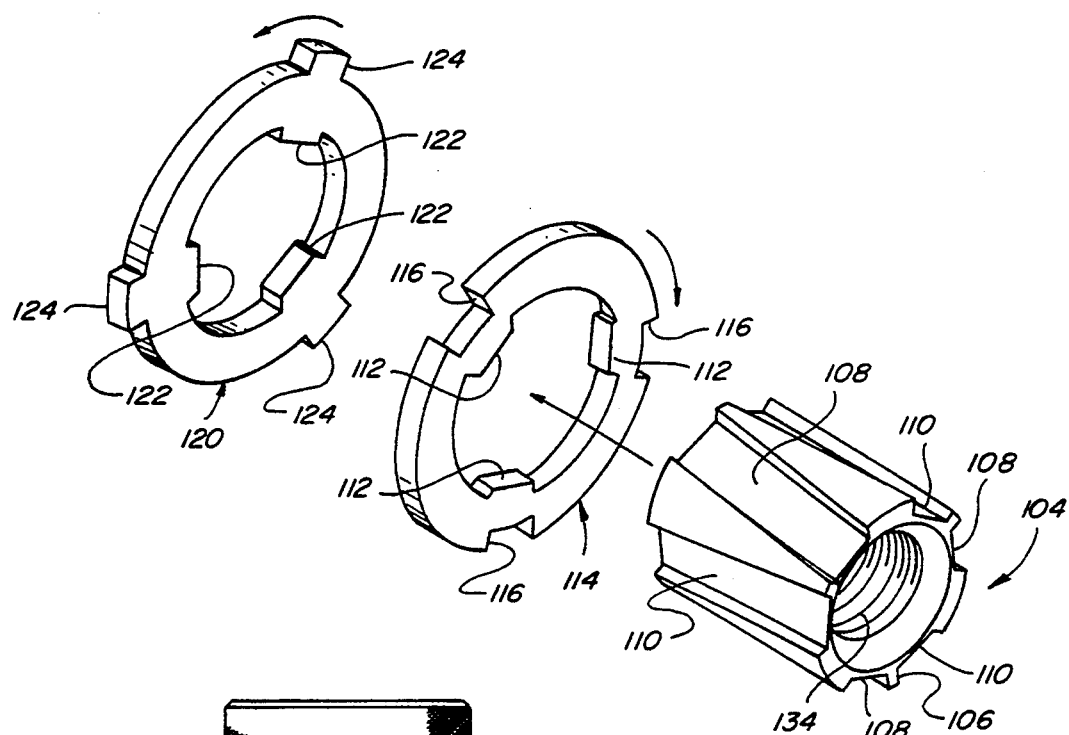
FIG. 10 is an exploded perspective view of the cam means of FIG. 9.

FIGS. 9 and 10 show another alternative lug gripping means construction. This construction is a cam-lock mechanism 88 which grips the respective outer surfaces or facets 90 of a hexagonal shaped lug 20 using a rotating or twisting action. The cam-lock mechanism 88 includes concentric inner and outer cam lug sleeve members 92 and 94, respectively. The inner cam lug sleeve 92 includes a hexagonal shaped flange 96 located adjacent the open end 98, and the outer cam lug sleeve 94 includes a hexagonal shaped flange 100 located adjacent the open end 102. The hexagonal shaped openings of the flanges 96 and 100 are approximately the same size and can be larger than the hexagonal shaped outer surface of a lug nut or bolt to enable use with different size lugs. The hexagonal facets of the openings act to grip and hold opposite ends or edges of the facets 90 of a lug inserted into the open ends of the concentric sleeves by the relative rotation or twisting of the sleeves 92 and 94.

The cam-lock mechanism 88 includes a rotator cam assembly 104 enabling rotating and angularly offsetting the outer sleeve 94 and the inner sleeve 92. The rotator cam assembly 104 includes a cylindrical shaped rotator cam member 106 having alternating grooves 108 and 110 extending divergingly towards one end thereof, as best shown in FIG. 10. The grooves 108 of the rotator cam 106 slidably receive tabs 112 located around the inner periphery of an inner sleeve lug ring 114 which also has notches 116 around the outer periphery thereof engageable by tabs 118 on the inner lug sleeve 92. An outer sleeve lug ring 120 includes tabs 122 slidably engageable with the grooves 110 on the rotator cam member 106 and tabs 124 engageable with notches 126 on the outer sleeve 94. This portion of the rotator cam assembly 104 is located in a cavity 128 adjacent the end of the outer sleeve 94 opposite the lug engaging end and is maintained therein by a snap-ring 130 which engages a groove 132 extending around the inside of the outer sleeve 94.

The rotator cam 106 includes a threaded bore 134 which threadedly receives a threaded draw bolt 136 mounted for rotation in a cavity of a sleeve member 138 on the pivot arm member 22 such that when assembled, the rotator cam end of the cam-lock mechanism 88 is located in the cavity. The cam-lock mechanism is maintained therein by a second snap ring 139 which engages a groove 141 extending around the inside of the sleeve 138. The draw bolt 136 can have a serrated or knurled outer gripping ring portion 140 and can be grasped and rotated in one direction relative to the rotator cam 106, which is restricted from rotation, to move the rotator cam 106 axially to cause the tabs 112 and 122 of the respective lug rings to slide divergingly in their respective grooves 108 and 110 to angularly offset the hexagonal shaped flanges 96 and 100 so as to lock against different edges or ends of facets 90 on the lug nut. Disengagement can be achieved by rotating the draw bolt 136 in the opposite direction to realign the hexagonal shaped flanges. An advantage of this mechanism is that it enables attachment to lug nuts which can be of slightly different size and it is quick and easy to use.

Figure 11:
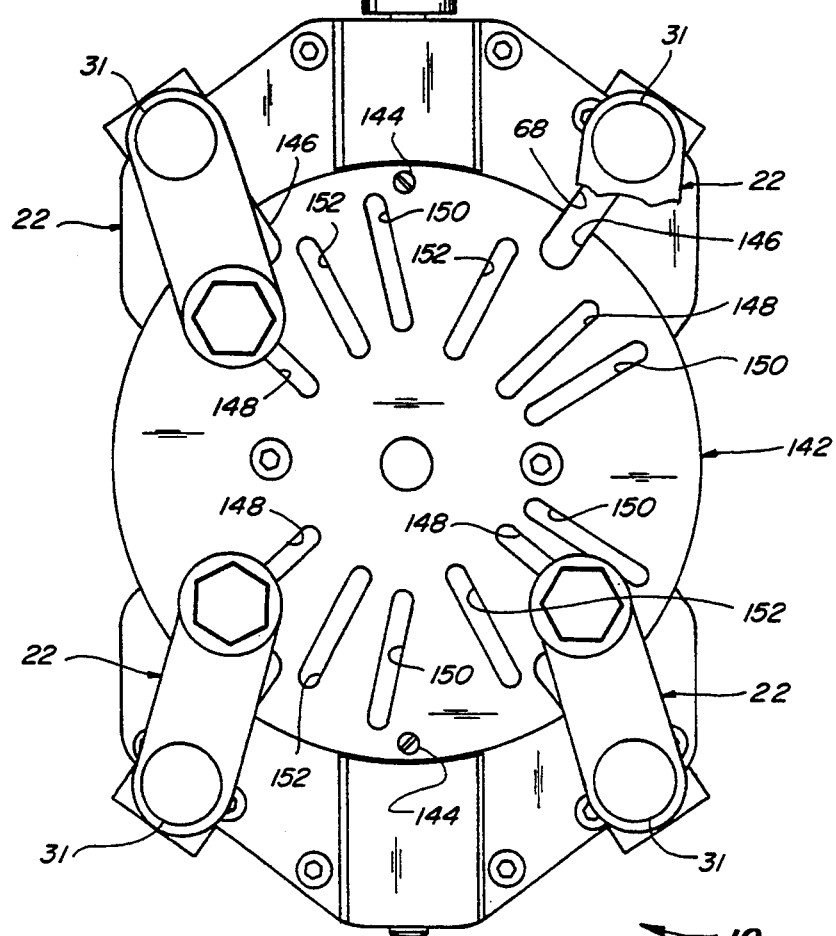
FIG. 11 is a rear elevational view of the device of FIG. 1, showing optional means for positioning and maintaining the lug engaging means in a plurality of different angular spaced relationships.

The present device 10 may also include optional means enabling positioning the respective lug clamp assemblies 22 in the proper relative angular positions for attachment to selected lugs of different lug patterns to enable maintaining the angular positions of the lug clamp assemblies as they are moved radially. Such positioning means can include a template or guide plate 142 which mounts on the rear face of the device, as shown in FIG. 11, using any suitable means such as the screws shown at 144. The template 142 includes a plurality of slots formed therein which correspond to the radial paths of the lug clamp assemblies 22 as they are moved radially. The template 142 can also include a plurality of notches 146 in the outer periphery thereof corresponding in location with the slots 68 of the rear housing member 56 to enable passage of the lug clamp assemblies thereover for attachment to smaller diameter lug patterns. The template 142, for instance, can include a plurality of slots 148 corresponding to a four lug pattern and an eight lug pattern. Slots 150 correspond to a five lug pattern and slots 152 correspond to a six lug pattern. Means on the respective lug clamp assemblies 22, such as spring detent means 153, can be engaged with the respective slots such as the slot 148 as shown in FIG. 11a, and are slidable therein to maintain the angular positions of the lug clamps as they move radially.

The present device 10 can also include means for mounting a wheel alignment instrument or other service device thereon, such as the mounting means 154 shown in FIGS. 12 and 12a. The mounting means 154 include a mounting member 156 having a bore 158 therein for receiving a mounting spindle 160 or other member associated with an alignment instrument or other service device such as shown at 162. The mounting member 156 can be located with the bore 158 located in coaxial relation with the central axis B of the device and such that an alignment instrument or other device 162 mounted thereon can be located in concentric or coaxial or other desired relation with the axis of a wheel on which the device is mounted, such as the axis A of the wheel assembly 12 as shown. The mounting means 154 can also include clamping means for securing the alignment instrument thereon, such as the lever actuated clamp means shown at 164.

Thus there has been shown and described a novel apparatus for attachment to the lugs of a vehicular wheel assembly for enabling positioning an alignment instrument adjacent to the wheel, which apparatus fulfills all of the objects and advantages set forth above. It will be apparent to those skilled in the art, however, that many changes, modifications, variations and other uses and applications for the subject invention are possible. All such changes, modifications, variations and other uses and applications which do not depart from the spirit and scope of the invention are deemed to be covered by the invention, which is limited only by the claims which follow.

What is claimed is:

1. Apparatus adaptable for attaching to a plurality of lugs associated with a vehicular wheel comprising;
   a base member having an axis therethrough,
   a plurality of lug engaging means mounted for angular and radial movement relative to said axis in angularly spaced relation around said axis, and
   means for radially moving said lug engaging means simultaneously relative to said axis regardless of the angular locations of said lug engaging means around said axis.

2. The apparatus according to claim 1 wherein said lug engaging means are mounted for pivotal movement on members radially movable relative to said axis.

3. The apparatus according to claim 2 wherein said means for radially moving said lug engaging means simultaneously comprise a turnbuckle.

4. The apparatus according to claim 2 comprising four lug engaging means.

5. The apparatus according to claim 4 wherein said four lug engaging means are pivotally mounted in spaced relation around said axis at alternating angles of approximately 72° and 108°.

6. The apparatus according to claim 1 further comprising means on said base member for mounting wheel alignment means thereon.

7. The apparatus according to claim 1 wherein each of said lug engaging means comprise socket means for cooperatively receiving and engaging a lug.

8. The apparatus according to claim 1 wherein each of said lug engaging means comprise cam actuated means for cooperatively engaging a lug.

9. The apparatus according to claim 1 further comprising means for maintaining each of said lug engaging means in at least one predetermined angular location during radial movement thereof.

10. Apparatus for attaching to selected lugs associated with a vehicular wheel assembly comprising;
    a base member having an axis therethrough,
    a plurality of members mounted on said base member at predetermined angularly spaced locations around said axis including means for simultaneously moving said plurality of members radially relative to said axis,
    members mounted respectively on at least some of said plurality of radially movable members for pivotable movement thereabout, and
    lug engaging means mounted respectively on at least some of said pivotable members at a location spaced from said respective radially movable members said pivotable members being pivotable to position said lug engaging means mounted thereon at different angular spaced locations around said axis for attachment to lugs located at different locations with respect to the vehicular wheel assembly.

11. The apparatus according to claim 10 wherein the means for simultaneously moving said plurality of members radially comprise a shaft member mounted for rotation on said base member, said shaft member having oppositely threaded end portions, and a member threadedly mounted on each oppositely threaded end portion of said shaft member for movement in opposite directions when said shaft member is rotated, each of said radially movable members being slidably engaged with one of said threadedly mounted members such that rotation of said shaft member simultaneously radially moves all of said radially movable members.

12. The apparatus according to claim 10 wherein the pivotable members are pivotable in a plane substantially normal to said axis.

13. The apparatus according to claim 10 further comprising means on said base member for mounting wheel alignment means thereon.

14. Apparatus adaptable for attaching to a plurality of lugs of a vehicular wheel assembly having an axis of rotation regardless of the number, angular spacing and radial positions of the lugs relative to the axis of rotation, the apparatus comprising;
    a base member having a central axis therethrough,
    a plurality of lug engaging means including movable members enabling positioning said lug engaging means at different angularly spaced locations around said central axis, and means for simultaneously moving said lug engaging means radially relative to said axis regardless of the angular locations of said lug engaging means around said axis.

15. The apparatus according to claim 14 wherein said means for radially moving said lug engaging means further comprise a shaft member mounted for rotation on said base member, said shaft member having oppositely threaded end portions, a member threadedly mounted on each of said oppositely threaded end portions of said shaft member for movement in opposite directions when said shaft member is rotated, and members mounted for radial movement on said base member at predetermined angular locations around said central axis, each of said radially movable members being oriented at an acute angle with respect to said shaft member and slidably engaged with one of said threadedly mounted members such that rotation of said shaft member imparts simultaneous radial movement to all of said radially movable members.

16. The apparatus according to claim 14 comprising at least three radially movable members mounted on said base member at intervals of approximately 72° and approximately 108° around said central axis.

17. Apparatus for attaching to a plurality of lugs associated with a vehicular wheel for mounting wheel alignment means adjacent thereto, the apparatus comprising;
    a base member having an axis therethrough,
    a plurality of lug engaging members located around said axis,
    means enabling positioning each of said lug engaging members at different angularly spaced locations around said axis, means for simultaneously moving said plurality of lug engaging members radially relative to said axis regardless of the angularly spaced locations of said lug engaging members about said axis, and
    means for mounting wheel alignment means on said apparatus.

* * * * *